US011787975B2

(12) United States Patent
Zaffaroni et al.

(10) Patent No.: US 11,787,975 B2
(45) Date of Patent: Oct. 17, 2023

(54) CYANOACRYLIC ADHESIVE COMPOSITIONS WITH IMPROVED RESISTANCE TO HIGH TEMPERATURES

(71) Applicant: PERMABOND ENGINEERING ADHESIVES LTD, Winchester (GB)

(72) Inventors: Giorgio Zaffaroni, Suno (IT); Alessio Monesi, Albizzate (IT)

(73) Assignee: PERMABOND ENGINEERING ADHESIVES LTD, Winchester (GB)

( * ) Notice: Subject to any disclaimer, the term of this patent is extended or adjusted under 35 U.S.C. 154(b) by 46 days.

(21) Appl. No.: 16/911,318

(22) Filed: Jun. 24, 2020

(65) Prior Publication Data
US 2020/0407596 A1 Dec. 31, 2020

(30) Foreign Application Priority Data
Jun. 25, 2019 (IT) .................. 102019000010053

(51) Int. Cl.
*C09J 4/00* (2006.01)
*C08F 2/26* (2006.01)
(Continued)

(52) U.S. Cl.
CPC ................ *C09J 4/00* (2013.01); *C08F 2/26* (2013.01); *C08F 2/38* (2013.01); *C08F 220/14* (2013.01);
(Continued)

(58) Field of Classification Search
CPC .... C09J 4/00; C08K 5/132; C08F 2/26; C08F 2/38; C08F 220/14; C08F 222/32; C08F 236/20
See application file for complete search history.

(56) References Cited

U.S. PATENT DOCUMENTS 3,832,334 A * 8/1974 O'Sullivan ........... C08F 222/00
526/225
3,948,794 A 4/1976 König
(Continued)

FOREIGN PATENT DOCUMENTS

EP 2154214 A2 2/2010
GB 1328176 A 8/1973
(Continued)

OTHER PUBLICATIONS

Burns, Barry, Cyanoacrylates: Towards High Temperature Resistant Instant Adhesives. A Critical Review, Chapter 10, Progress in Adhesion and Adhesives, vol. 3 (341-368) K.L. Mittal (ed.) 2018 Scrivener Publishing LLC.
(Continued)

*Primary Examiner* — Catherine S Branch
(74) *Attorney, Agent, or Firm* — HEDMAN & COSTIGAN, P.C.; James V. Costigan; Kathleen A. Costigan

(57) ABSTRACT

Cyanoacrylic adhesive compositions of the type comprising at least one cyanoacrylic acid ester or one malonic acid ester having an allyl, acrylic or methacrylic group, wherein there is also present at least one radical initiator of the polymerization reaction of the allyl, acrylic or methacrylic ester of cyanoacrylic acid or malonic acid and at least one radical inhibitor of said polymerization reaction. In comparison with known cyanoacrylic adhesive compositions, those according to the invention offer the advantage of maintaining their bonding capability even at high temperatures, in particular up to 150° C.

16 Claims, 1 Drawing Sheet

(51) Int. Cl.
  *C08F 2/38* (2006.01)
  *C08F 220/14* (2006.01)
  *C08F 222/32* (2006.01)
  *C08F 236/20* (2006.01)
  *C08K 5/132* (2006.01)
  *C08K 5/14* (2006.01)
  *C08K 5/23* (2006.01)

(52) U.S. Cl.
  CPC .......... *C08F 222/32* (2013.01); *C08F 236/20* (2013.01); *C08K 5/132* (2013.01); *C08K 5/14* (2013.01); *C08K 5/235* (2013.01)

(56) References Cited

U.S. PATENT DOCUMENTS

| | | | |
|---|---|---|---|
| 4,196,271 A | 4/1980 | Yamada et al. | |
| 4,450,265 A | 5/1984 | Harris | |
| 4,490,515 A | 12/1984 | Mariotti et al. | |
| 6,547,917 B1* | 4/2003 | Misiak | C09J 5/02 156/331.2 |
| 2002/0098150 A1* | 7/2002 | Krall | C09J 4/00 424/9.4 |
| 2007/0078207 A1 | 4/2007 | Jonn | |
| 2020/0152350 A1* | 5/2020 | Yamaga | H01B 3/307 |

FOREIGN PATENT DOCUMENTS

| | | | | |
|---|---|---|---|---|
| WO | WO-2018216737 A1 * | 11/2018 | ............... | C09K 3/10 |
| WO | WO-2020167713 A1 * | 8/2020 | ............ | C08F 220/20 |

OTHER PUBLICATIONS

Kotzev, D.L., Assessment of the Adhesive Bond Properties of Allyl 2-Cyanoacrylate. Journal of Applied Polymer Science, vol. 26, 1941-1949 (1981) John Wiley & Sons, Inc.

Italian Search Report in corresponding application dated Feb. 25, 2020.

* cited by examiner

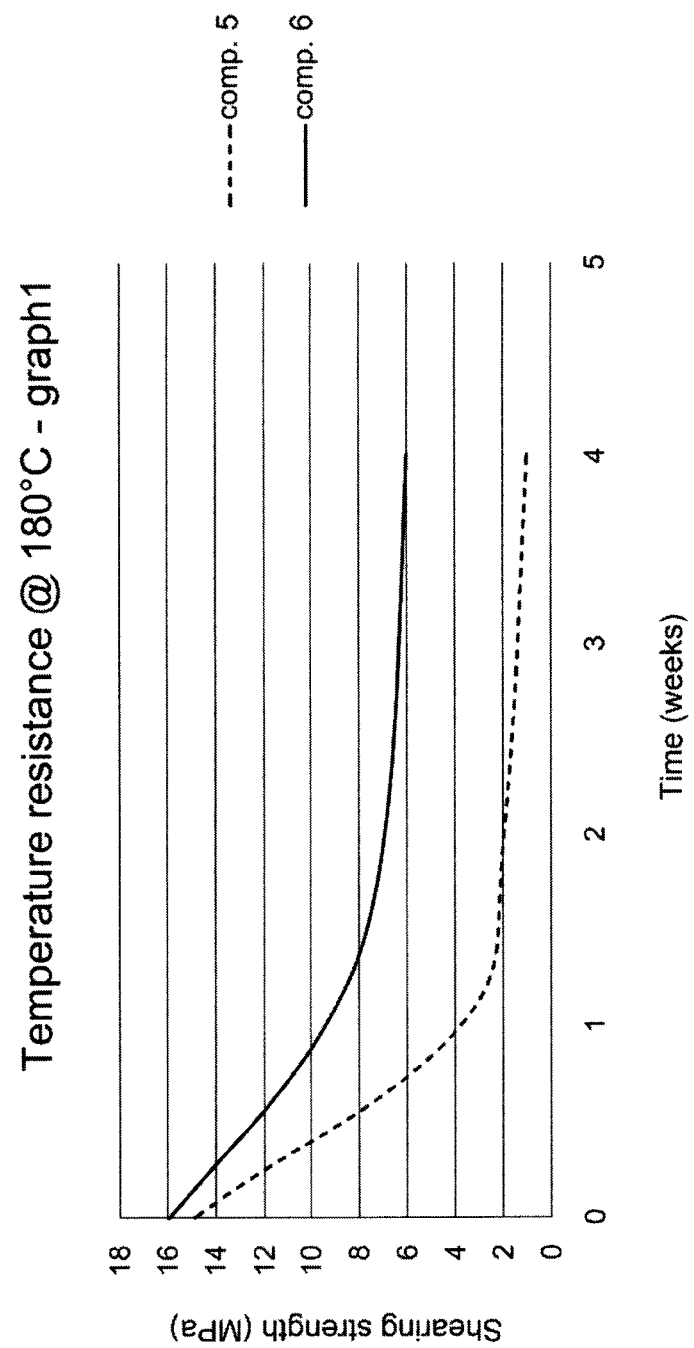

CYANOACRYLIC ADHESIVE COMPOSITIONS WITH IMPROVED RESISTANCE TO HIGH TEMPERATURES

BACKGROUND OF THE INVENTION

The present invention relates to cyanoacrylic adhesive compositions exhibiting improved resistance to high temperatures.

The field of the invention is that of instant cyanoacrylic base adhesives, used in the electromechanical industry and the like, for example for bonding the winding packs of transformers.

Cyanoacrylic acid esters are an important class of molecules used in the formulation of instant adhesives known as cyanoacrylic adhesives, also commonly called cyanoacrylates. These adhesives are known for rapid polymerization and for the ability to bond a huge variety of substrates such as metals, rubbers, polymers in general and the like.

It is known that the polymerization of cyanoacrylates with adhesive properties takes place through an anionic polymerization reaction, triggered by even weakly basic species present on the surfaces being bonded. It is also known that cyanoacrylates lose adhesion when operating in hot and/or humid environments, as well as in basic environments. In particular, operating environments involving high temperatures cause cyanoacrylates to partly or wholly depolymerize, even in the absence of moisture or other chemical agents. For this reason, much of the patent literature and technological research is dedicated to improving the performance of the aforementioned adhesives at high temperatures, generally above 100° C.

It is assumed that the limited resistance to temperature of cyanoacrylic adhesives is due to a de-polymerization by "unzipping". An excellent and updated summary of the scientific and patent state of the art can be found in the important work by B. Burns "Cyanoacrylates: Towards High Temperature Resistant Instant Adhesives. A Critical Review" in K. L. Mittal (Ed.), Progress in Adhesion and Adhesives, Vol. 3, which is incorporated herein as a reference together with all the patents mentioned in the article's references. For example, U.S. Pat. No. 3,832,334 relates to the use of maleic anhydride which leads to improved thermal resistance properties, while maintaining a high polymerization rate. U.S. Pat. No. 4,196,271 uses polycarboxylic acids or their anhydrides for the same purpose. U.S. Pat. No. 4,450,265 discloses a cyanoacrylic formulation comprising at least one cyanoacrylic ester in the presence of phthalic anhydride, with the aim of favorably influencing the mechanical strength and durability of the bonded joint when exposed to high temperatures.

Generally speaking, there are two general approaches which have been proposed to overcome the limitation. The first ("crosslinking approach") relates to the development of chemical bonds between chains (crosslinks) in molecules with multiple functional groups, while the second relates to the addition of stabilizers as in the examples reported above, or the use of bismaleimides as in U.S. Pat. No. 4,490,515. The first approach (crosslinking) includes the industrial practice relating to the use of the allyl cyanoacrylic monomer in cyanoacrylic adhesives for high temperature cyanoacrylates (see for example D. L. Kotzev "Assessment of the adhesive bond properties of Allyl 2 cyanoacrylate"). It is hypothesized that the functioning mechanism of this monomer is based on radical postpolymerization in the allyl groups which would occur at high temperatures (120-150° C.), while at temperatures below 90° C. the normal polymerization of the activated double bond would take place via the anion.

US2007/078207A1 and EP2154214A2 disclose adhesive compositions based on polymerizable cyanoacrylate monomers. GB1328176A describes adhesive compositions containing cyanoacrylates having polymerizable groups. U.S. Pat. No. 3,948,794A relates to adhesive compositions containing cyanoacrylates and itaconic anhydride.

SUMMARY OF THE INVENTION

The main object of the present invention is to provide cyanoacrylic adhesive compositions which offer improved mechanical strength at high temperatures in comparison with known compositions of this type, in particular at temperatures between 120° C. and 200° C., and mitigate the effects of the previously mentioned thermal de-polymerization.

This and other objects are accomplished through the compositions in claim 1. Preferred ways of producing the compositions according to the invention are characterized in the remaining claims.

BRIEF DESCRIPTION OF THE DRAWINGS

The FIGURE is a graph of test data that compares the shearing strengths of aged formulations 5 and 6.

In comparison with known cyanoacrylic adhesive compositions, those according to the invention offer the advantage of maintaining their bonding capacity even at high temperatures, in particular up to 150° C.

DESCRIPTION OF THE PREFERRED EMBODIMENTS

These and other objects, advantages and characteristics will be apparent from the following description of some preferred embodiments of the compositions according to the invention, provided only by way of a non-limiting example.

The compositions according to the invention comprise at least one cyanoacrylic acid ester, or one malonic acid ester and derivatives thereof, having an allyl, acrylic or methacrylic group.

The esters described above have in particular:
  at least one cyanoacrylate or malonate functional group, which polymerizes at room temperature via anionic route and which de-polymerizes at temperatures higher than 100° C.;
  at least one allyl, acrylic or methacrylic functional group which has the property of polymerizing at high temperatures (120-150° C.), compensating for the de-polymerization that occurs in the cyanoacrylate or malonate functional group.

Examples of cyanoacrylate esters suitable for the invention are ethyl cyanoacrylate, allyl cyanoacrylate, butyl cyanoacrylate, methoxyethyl cyanoacrylate.

Examples of malonic esters suitable for the invention are di-ethylmalonate (such as dimethacrylmethylidene malonate), dibutyl-malonate, dimethylmalonate, diallyl-malonates (such as diallylmethylidene malonate and the ester of methylenmalonic acid).

Furthermore, the compositions according to the invention include radical initiators, for example peroxides, hydroperoxides, diazo compounds and the like, in particular from about 0.1 to 10% with respect to the total weight of the cyanoacrylate or malonate, to start the polymerization process on the allyl, acrylic or methacrylic group.

Examples of radical initiators suitable for the objects of the invention are tert-butyl peroxyacetate, tert-butyl peroxybenzoate, butyl 4,4-di(tert-butylperoxy) valerate.

According to the invention, the polymerization induced by the radical initiator on the allyl, acrylic or methacrylic group of the allyl-cyanoacrylate or malonate is controlled by addition of at least one radical inhibitor, in order to prevent the polymerization of the allyl, acrylic or methacrylic group from being anticipated excessively compared to the depolymerization process at high temperatures, generating embrittlement of the polymer with consequent loss of performance.

To this end, the compositions according to the invention include a carefully controlled quantity of radical inhibitors, quinones and hydroquinones, which act on the radical polymerization process, inhibiting it at temperatures below about 100° C. Hydroquinone mono-methyl ether inhibitors used in quantities of 0.2 or more by weight based on the amount of radical initiator are preferred for the invention.

In fact, premature polymerization of the allyl, acrylic or methacrylic groups would lead to embrittlement of the adhesive (excessive cross-linking), while a too late radical polymerization would not be able to maintain the desired mechanical strength of the adhesive at high temperatures.

The compositions according to the invention therefore comprise the allyl, acrylic or methacrylic esters of cyanoacrylic acid or malonic acid and their derivatives, alone or in combination with other esters of cyanoacrylic acid or malonic acid, such as for example ethyl cyanoacrylate, methyl cyanoacrylate, di-ethyl malonate or dimethyl malonate. There is also a radical polymerization initiator with a half-life of one hour or more at 85° C. and at least one radical polymerization inhibitor formed, for example, by a hydroquinone.

Advantageously according to the invention there is also an acrylic or methacrylic aromatic monomer, with preferably two functional groups, with the ability to increase the mechanical strength of the polymer at high temperatures.

In particular, the compositions according to the invention include:
  one or more allyl, acrylic or methacrylic esters of cyanoacrylic acid or malonic acid and their derivatives, having a molecule polymerizable via anionic route and a group polymerizable via radical route (the allyl, acrylic or methacrylic group);
  one or more radical polymerization initiators, such as organic peroxides such as tert-butyl peroxybenzoate, tert-butyl peroxyacetate, butyl 4,4-di(tert-butylperoxy) valerate and benzoyl peroxide, or organic hydroperoxides such as isopropylcumyl hydroperoxide, or diazo compounds such as azobisisobutyronitrile and derivatives. The most appropriate initiator in the formulation is primarily chosen from among those having the parameter known as the 1-hour-half-life-temperature greater than or equal to 120° C. In particular, the initiator used in the compositions according to the invention is a peroxide having a half-life of 1 hour or more at 85° C. and is present in a concentration of not less than 0.1% and not more than 10% by weight, preferably in a concentration of 0.2-5%, even more preferably 0.5-2%;
  a radical inhibitor such as quinones, hydroquinone (HQ), hydroquinone monomethyl ether (MEHQ), hydroxytoluene butylate (BHT), substituted phenols and the like in an amount of 0.005-10%, preferably 0.01-5%, even more preferably 0.2-0.5% by weight, such as to significantly inhibit the radical polymerization reaction below 120° C.

In particular, the molar ratio between the radical initiator and the radical inhibitor in the composition according to the invention is comprised between 0.1 and 15, preferably between 1 and 12, with a preferred value comprised between 2.2 and 5.

The compositions according to the invention can further comprise:
  anionic polymerization stabilizing agents such as trifluoroboric, trifluoroacetic, trifluoromethanesulfonic acids and the like, such as $BF_3O(CH_2CH_3)_2$;
  accelerators of anionic polymerization such as calixarenes, crown ethers and the like;
  at least one preferably aromatic acrylic or methacrylic monomer having two functional groups, such as for example the methacrylic diester of bisphenol-A-ethoxylate,
  one or more monomers with a strongly activated double bond, or a double bond having an electronic density shifted towards the electron attractor groups, so as to make the double bond easily attachable by nucleophilic groups, susceptible to anionic polymerization such as esters of the cyanoacrylic acid of chemical formula $H_2C=C(CN)—COOR$ or esters of malonic acid $R'OOC—CH_2—COOR''$ wherein R is an organic functional group such as for example alkyl or ether alkyl such as methyl cyanoacrylate, butyl cyanoacrylate, octyl cyanoacrylate, methoxyethyl cyanoacrylate and the like while R' and R'' are generally organic functional groups such as methyl, ethyl and the like;
  toughening and/or flexibilizing elastomers such as, but without the examples being limiting, the polymers of the Vamac series by Dupont or Vinnol by Wacker;
  additives such as rheological modifiers such as PMMA Degalan, coloring agents such as carbon black and the like;
  preservatives of resistance to high temperatures, such as anhydrides, such as maleic anhydride and the like.

In the compositions according to the invention the monomer having two functional groups previously mentioned is formed by a molecule or by a mixture of molecules, containing within the same chemical structure a strongly activated double bond susceptible to anionic polymerization and a group which easily polymerizes via radical route, such as for example an allyl group.

In the compositions according to the invention the said acrylic or methacrylic monomer having two functional groups is formed by a C1-C1000 organic molecule containing at least two groups polymerizable via radical route, which are not polymerizable though an anionic mechanism. The molecule preferably contains aromatic rings in its skeleton.

The mechanism of the radical polymerization reaction previously mentioned is as follows:

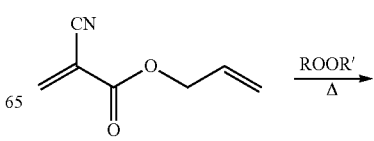

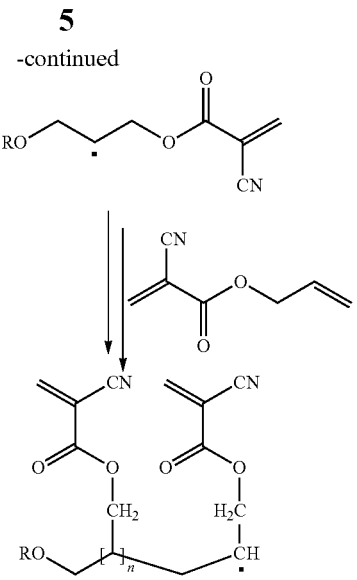

EXAMPLES

The following formulations of the invention have been prepared by stirring of a radical inhibitor chosen from hydroquinone monomethyl ether and butyl hydroxytoluene in a tank in an inert and moisture-free atmosphere, in the presence particularly of a radical supplement selected from tert-butylperoxybenzoate and butyl 4,4-di(tert-butylperoxy) valerate, as well as in the presence of $BF_3O(CH_2CH_3)_2$ as stabilizer of the anionic polymerization, until a homogeneous and transparent product is obtained.

Composition 1
Allyl cyanoacrylate: 98.899%
Butyl 4,4-di(tert-butyl peroxy)valerate: 0.800%
Butyl hydroxytoluene: 0.200%
$BF_3O(CH_2CH_3)_2$: 0.001%

Composition 2
Methacryl-cyanoacrylate: 98.899%
Butyl 4,4-di(tert-butylperoxy)valerate: 0.800%
Butyl hydroxytoluene: 0.200%
$BF_3O(CH_2CH_3)_2$: 0.001%

Composition 3
Di-allyl methylidene-malonate 98.899%
Tert-butyl-peroxyacetate: 0.800%
Hydroquinone monomethyl-ether: 0.200%
$BF_3O(CH_2CH_3)_2$: 0.001%

Composition 4
Dimethacryl methylidene-malonate 98.899%
Tert-butyl-peroxyacetate: 0.800%
Hydroquinone monomethyl-ether: 0.200%
$BF_3O(CH_2CH_3)_2$: 0.001%

Composition 5
Ethyl cyanoacrylate: 41.000%
Allyl cyanoacrylate: 42.889%
PMMA (Degalan 5906 dried): 6.000%
Hydroquinone monomethyl-ether: 0.010%
$BF_3O(CH_2CH_3)_2$: 0.001%
Maleic anhydride: 0.100%
HDDA 10.000%
Tert-butyl peroxybenzoate: 0.200%
Measured properties: Viscosity: 100 mPas, Bonding rate on mild steel: 20 seconds. Molar ratio (peroxide-inhibitor): 16

Composition 6
Ethyl cyanoacrylate: 41.400%
Allyl cyanoacrylate: 41.499%
Bisphenol-A-ethoxylate-methacrylate: 10.000%
PMMA (Degalan 5906 dried): 6.000%
Tert-butyl peroxybenzoate: 0.800%
Hydroquinone monomethyl-ether: 0.200%
$BF_3O(CH_2CH_3)_2$: 0.001%
Maleic anhydride: 0.100%
Measured properties: Viscosity: 100 mPas, Bonding rate on mild steel: 20 seconds. Molar ratio (peroxide-inhibitor): 2.5

Composition 7
Ethyl cyanoacrylate: 41.000%
Allyl cyanoacrylate: 40.499%
Bisphenol-A-ethoxylate-methacrylate: 10.000%
PMMA (Degalan 5906 dried): 6.000%
Tert-butyl peroxybenzoate: 2.200%
Hydroquinone monomethyl-ether: 0.200%
$BF_3O(CH_2CH_3)_2$: 0.001%
Maleic anhydride: 0.100%
Measured properties: Viscosity: 100 mPas, Bonding rate on mild steel: 20 seconds. Molar ratio (peroxide-inhibitor): 10

Composition 8
Ethyl cyanoacrylate: 41.000%
Allyl cyanoacrylate: 41.499%
Bisphenol-A-ethoxylate-methacrylate: 10.000%
PMMA (Degalan 5906 dried): 6.000%
Tert-butyl peroxybenzoate: 0.800%
Hydroquinone monomethyl-ether: 0.400%
$BF_3O(CH_2CH_3)_2$: 0.001%
Maleic anhydride: 0.100%
Measured properties: Viscosity: 100 mPas, Bonding rate on mild steel: 20 seconds. Molar ratio (peroxide-inhibitor): 1.3

Adhesion Test

Adhesion was measured by means of the adhesion test commonly referred to as Lap Shear Test performed using a tensile dynamometer providing a specific shear strength (LSS or Lap Shear Strength in the technical literature).

The tests were performed on bonded joints prepared as indicated below.

The 14 mm wide mild steel test samples were sandblasted with Grit 220 aluminum oxide and then subsequently cleaned with acetone.

Adhesive compositions 5, 6, 7 or 8 were applied on one of the pieces to be bonded which was joined to the other using a template to maintain a 12.5 mm overlap as constant as possible. The joint was immobilized (clamping) by means of suitable clamps.

The joint was left to rest for 24 hours at room temperature, then underwent 3 types of test:
i. The bonded samples were tested at different temperatures;
ii. The bonded samples were placed in a stove at 180° C. with a static load of 75 N applied to the joint. The condition of the joint was checked visually every 5 minutes;
iii. The samples were aged in a stove at 180° C., taken from the same after a variable time interval and, once returned to room temperature, tested with a dynamometer.

Results
i. The bonding strength of samples brought to the test temperature without applied stresses are shown in table 1 below:

TABLE 1

| Lap shear | Composition 5 | Composition 6 | Composition 7 | Composition 8 |
|---|---|---|---|---|
| at RT (MPa) | 18 | 18 | 18 | 18 |
| at 150° C. (Mpa) | 2 | 4 | 8 | 2 |
| at 180° C. (Mpa) | 1.5 | 3 | 6 | 2.5 |
| at 200° C. (Mpa) | 1 | 3 | 3 | 3 | ii. The samples placed in a stove at 180° C. with an applied static load of 75 N were checked every 5 minutes:

TABLE 2

| at 180° C. + 75N | Composition 5 | Comp. 6 |
|---|---|---|
| after 5 minutes | Loss of adhesion | OK |
| after 1 hour | — | OK |
| after 3 hours | — | OK |

These values demonstrate that, in order to maintain adhesive properties, it is necessary to have a controlled radical initiator/inhibitor molar ratio, that prevents a premature triggering of the radical polymerization.

iii. The assembled samples were aged for several weeks at 180° C. and then tested at room temperature. The results are in Table 3.

TABLE 3

| | Composition 5 | Composition 6 |
|---|---|---|
| Lap shear (N/mm$^2$) at RT | 18 | 18 |
| Lap shear (N/mm$^2$) 1 week at 180° C. | 4 | 10 |
| Lap shear (N/mm$^2$) 2 weeks at 180° C. | 2 | 8 |
| Lap shear (N/mm$^2$) 4 weeks at 180° C. | 1 | 6 |

The change in shearing strength (N/mm$^2$) vs aging time (weeks) is also shown in the graph in the FIGURE.

The invention claimed is:

1. A cyanoacrylic adhesive composition, comprising:
   at least one cyanoacrylic acid ester having an allyl, acrylic or methacrylic group, that further comprises:
   at least one radical initiator of a polymerization reaction of said allyl, acrylic or methacrylic ester of cyanoacrylic acid;
   and at least one radical inhibitor of said polymerization reaction,
   wherein said radical initiator is present in an amount comprised between 0.1% and 10% by weight and wherein said radical inhibitor is present in an amount comprised between 0.2% and 0.5% by weight.

2. The composition according to claim 1, comprising at least one radical initiator in combination with at least one radical inhibitor, suitable for polymerizing said allyl, acrylic or methacrylic functional groups at temperatures ranging from 120 to 150° C., by compensating for the de-polymerization that occurs for the cyanoacrylic functional group of the cyanoacrylic acid ester.

3. The composition according to claim 1, wherein said radical initiators are peroxides, hydro-peroxides or diazo-compounds.

4. The composition according to claim 1, wherein said radical inhibitor is selected among quinones, hydroquinones, and substituted phenols.

5. The composition according to claim 1, wherein the molar ratio between the radical initiator and the inhibitor is between 0.1 and 15.

6. The composition according to claim 1, wherein the molar ratio between the radical initiator and the inhibitor is between 1 and 12.

7. The composition according to claim 1, wherein the molar ratio between the radical initiator and the inhibitor is between 2.2 and 5.

8. The composition according to claim 1, further comprising anionic polymerization stabilizing agents.

9. The composition according to claim 1, further comprising borontrifluoride, trifluoroacetic or trifluoromethane sulfonic acids as stabilizing agents.

10. The composition according to claim 1, further comprising accelerators of anionic polymerization.

11. The composition according to claim 10, wherein said accelerators of anionic polymerization are calixarenes or crown ethers.

12. The composition according to claim 1, further comprising at least one acrylic or methacrylic monomer having two functional groups.

13. The composition according to claim 1, further comprising one or more monomers with strongly activated double bonds which are susceptible to anionic polymerization.

14. The composition according to claim 13, wherein said one or more monomers with strongly activated double bonds are cyanoacrylic acid esters selected from the group consisting of methyl cyanoacrylate, ethyl cyanoacrylate, allyl cyanoacrylate, butyl cyanoacrylate, octyl-cyanoacrylate and methoxyethyl cyanoacrylate.

15. The composition according to claim 1, further comprising toughening and/or flexibilizing elastomers.

16. The composition according to claim 1, further comprising rheological modifiers and high temperature resistance preservatives.

* * * * *